Feb. 8, 1944.     T. A. UNSWORTH     2,341,130
METHOD OF MAKING FIBROUS BATS
Filed May 12, 1939     2 Sheets-Sheet 1
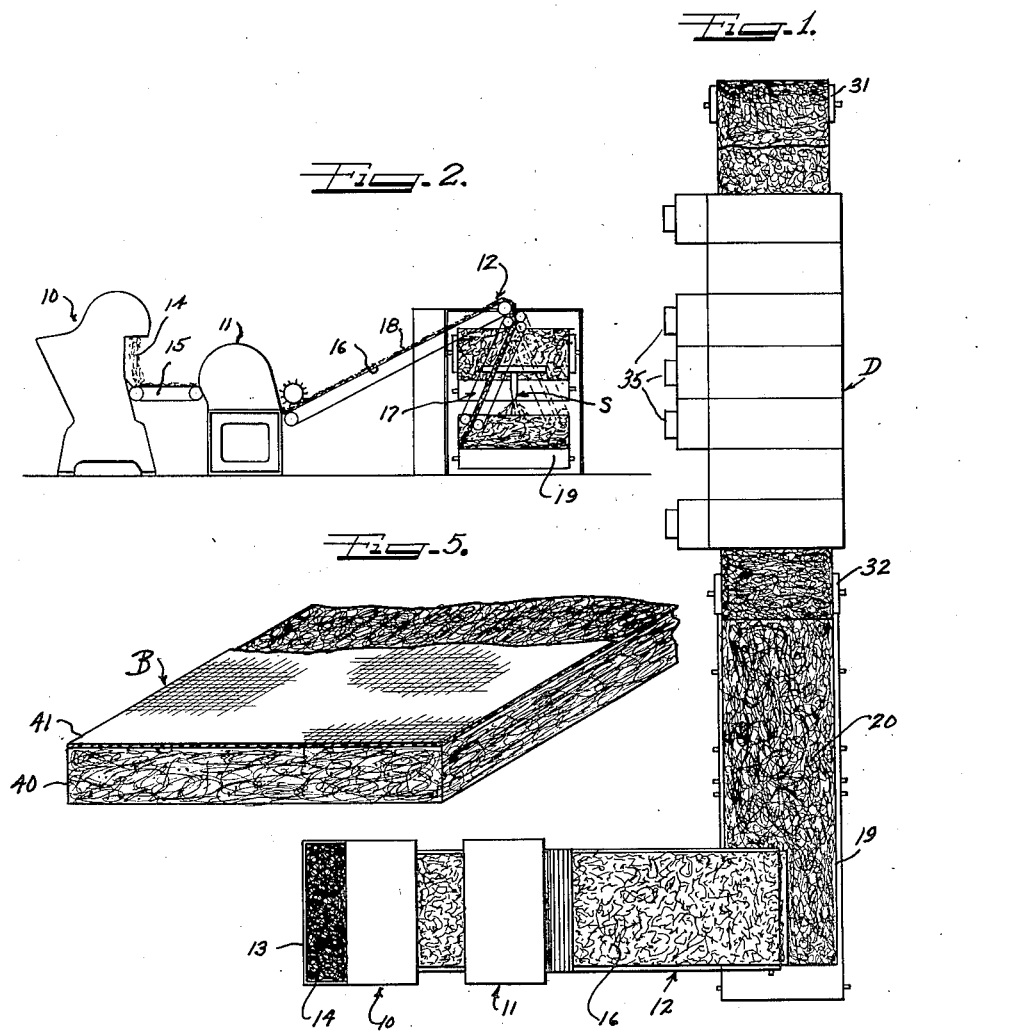
Inventor
THOMAS A. UNSWORTH

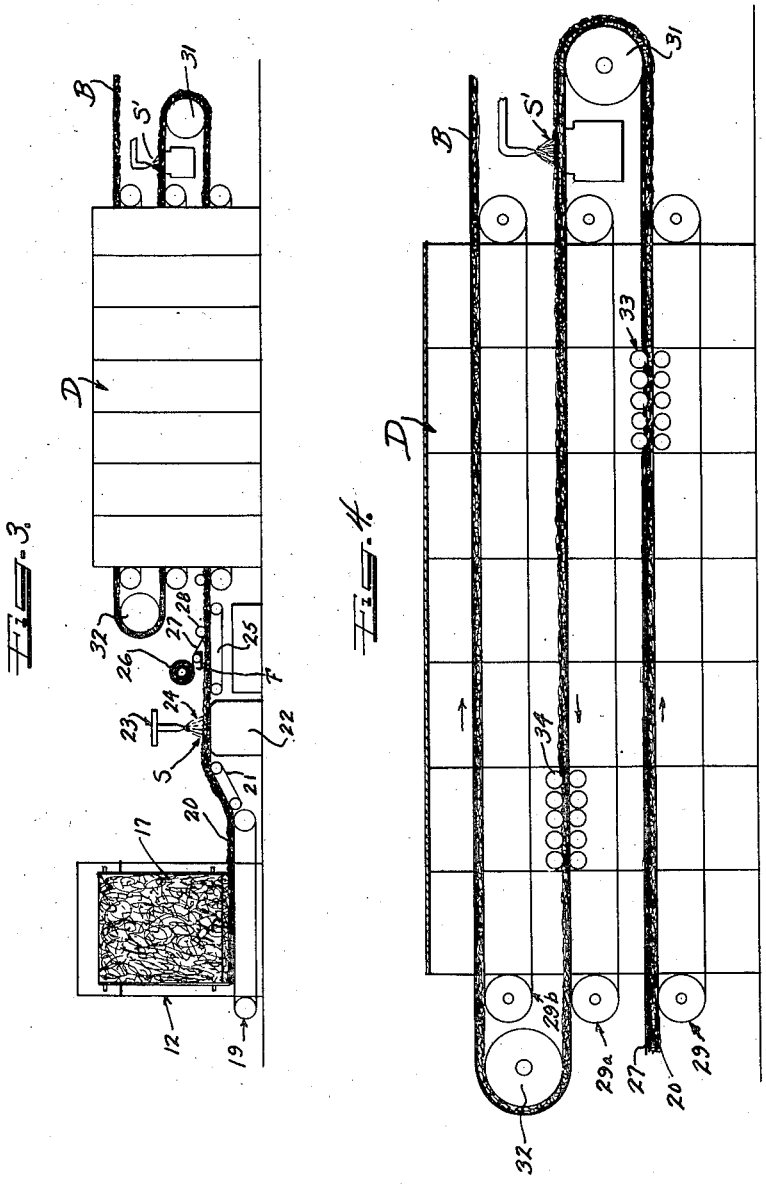

Patented Feb. 8, 1944

2,341,130

UNITED STATES PATENT OFFICE 2,341,130

METHOD OF MAKING FIBROUS BATS

Thomas A. Unsworth, Burlington, Vt., assignor to E. B. & A. C. Whiting Company, Burlington, Vt., a corporation of Vermont Application May 12, 1939, Serial No. 273,210

2 Claims. (Cl. 154—33)

This invention relates to a method of and machine for making fibrous bats. More particularly, the invention relates to a continuous method for making bats of open mesh, loosely associated fibrous material, bonded together to retain such association during handling.

It has heretofore been proposed, as in the Weber et al. Patent No. 1,906,028, to make a shaped fibrous mat by the use of molds. The present invention, however, contemplates a continuous method of making an endless bat, from which portions may be cut to be made up into cushions, pads and the like.

In accordance with my method, a bat of loosely intermingled fibers is formed on a traveling forming surface, a liquid bonding composition is applied to the bat to coat the fibers, and then, either before or during the drying of the bonding composition, the bat is compressed to the desired thickness, preferably all in a single continuous operation. The bonding agent preferably used is a vulcanizable rubber latex, which is suitably applied by spraying onto a surface of the fibrous bat. The sprayed latex is drawn through the bat to ensure thorough impregnation and coating thereof by the action of suction applied thereto, or by other suitable means. After the rubber latex coating has been partially or completely dried and the bat compressed to the desired thickness, the rubber latex residue is then vulcanized to bond the fibers of the bat together.

It is therefore an important object of this invention to provide a method of and machine for the continuous manufacture of fibrous bats formed of loosely associated fibers bonded together to provide an open mesh bat of great resiliency.

It is a further important object of this invention to provide a method that is continuous and that is adapted for use on a large scale in the manufacture of fibrous bats formed of rubberized fibers that have been vulcanized to bond them in a loosely associated, porous mass.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view, more or less diagrammatic, of apparatus suitable for use in carrying out the continuous method of my invention.

Figure 2 is an end elevational view of the same.

Figure 3 is a side elevational view looking toward the coating and drying section of the apparatus.

Figure 4 is an enlarged sectional view of the drier section of the apparatus, with parts in elevation.

Figure 5 is a fragmentary perspective view of a fibrous bat made by the method of my invention.

As shown on the drawings:

The reference numeral 10 indicates generally a feeder, the reference numeral 11 a garnett, and the reference numeral 12 a camel-back lapper, all of which pieces of equipment may be of standard or conventional design such as used in making mattress and upholstery batting.

The feeder 10 is provided with a hopper 13, into which fibers 14 are loaded. The fibers 14 are drawn through the mechanism of the feeder and automatically measured weights or volumes of the fibers are periodically dropped therefrom onto a traveling apron 15, which conveys the fibers to the garnett machine 11.

In the garnett 11, the fibers are picked, or carded, and doffered onto an upwardly traveling conveyor 16. The conveyor 16 constitutes a part of the camel-back type lapper 12, which also includes an oscillatable, downwardly inclined lapper conveyor 17. The layer 18 of fibrous material which is carried up the conveyor 16, travels downwardly on the conveyor 17 and is lapped back and forth by the oscillating movement thereof in being deposited upon the conveyor 19. The conveyor 19 travels at right angles to the direction of travel of the fibrous material over the lapper.

There is thus built up on the conveyor 19 a continuous layer 20, the fibers of which are in a loosely associated, intermingled condition. The thickness of the layer 20 may, of course, be determined by the speed of travel of the conveyor 19 and the speed of operation of the lapper 12. A short, upwardly inclined conveyor 21 carries the layer 20 to spraying apparatus, indicated generally by the reference character S, which may suitably comprise a lower suction chamber 22 and an upper spray head 23. A liquid bonding composition 24 is sprayed onto the moving layer 20 and is drawn by suction through the bat to thoroughly impregnate and coat the fibers thereof. The individual fibers are thus uniformly coated with the bonding composition. At the same time the layer 20 is somewhat compacted by the action of the suction and the liquid bonding composition.

Beyond the spraying apparatus S a conveyor 25 picks up the layer 20 and conveys it under a roll 26 of fabric 27, which is pressed by a roll 28 against the upper face of the layer 20.

In order to insure a good bond between the fabric 27 and the layer 20, it is preferable to coat the under side of the fabric with a bonding composition, which may be the same as, or different from that used in the spraying apparatus S. A fountain roll assembly F is provided for applying the bonding composition to the fabric 27. The laminated fabric covered layer 20 is next conveyed into a drier D.

The drier D comprises a chamber 27, in which are mounted three horizontally disposed conveyors 29, 29a and 29b, superimposed one above the other. A reversing roll 31 is positioned at the delivery end of the drier between the lowermost pass 29 and the intermediate pass 29a. A second reversing roll 32 is positioned at the intake end of the drier between the intermediate pass 29a and the upper pass 29b. Adjustably spaced compressing rolls are arranged in a plurality of sets, such as the set 33 associated with the upper run of the conveyor 29 and the set 34 associated with the upper run of the conveyor 29a. Blowers 35 are positioned along the back side of the drier for delivering heated air into the drying chamber.

A second spraying apparatus, indicated generally by the reference character S' may be positioned between the reversing roll 31 and the end of the intermediate conveyor 29a. When passing through the spray apparatus S', the reverse side of the fabric covered layer 20 is sprayed with a bonding composition.

In the manufacture of an endless batting on the machine just described, I may use any suitable fibers, whether of vegetable, animal or mineral origin, or mixtures thereof. The fiber that I prefer to use, however, is known as tampico fiber, obtained from a plant of the tula family called *Agave lechuguilla*. This fiber is also variously called istle, or ixtle, or Mexican tampico fiber. The preference for this type of fiber is due to its inherent properties, the fiber being approximately round in cross section, dense and stiff, as contrasted with the flat, ribbon-like fiber of loosely formed cell structure that is found in jute, sisal, hemp and the like.

While any suitable bonding agent may be employed, such as a solution of a vegetable or animal adhesive, gum, resin or the like, I prefer to employ a vulcanizable rubber latex. I have found it advantageous to spray the rubber latex onto the traveling bats, as at the spray stations S and S', while the bat is traveling over a suction chamber. The latex is thus distributed uniformly over the surfaces of the fibers and is caused to enter the surface pores thereof. The action of the suction is also to compact the layer 20 somewhat and to effect some evaporation of the water content of the latex. At the same time, the vapors produced, which would otherwise be objectionable, are drawn downwardly into the suction chamber and carried away. The amount of rubber latex retained on the fibers is preferably about 1 part of dry solids to 3 parts of fiber, by weight. This proportion may, however, be varied considerably, say between the limits of 1 to 4 and 1 to 2, depending upon the properties desired in the finished product.

After leaving the spraying apparatus S, the web of textile fabric 27 is laid directly over the moist surface of the sprayed layer 20 and the combined layer and fabric facing passed into the drier D. As the laminated web passes over the lowermost conveyor 29, it is subjected to a drying temperature in the neighborhood of 150 to 180° F. After the laminated web has been partially dried, it passes between the set of rollers 33, which are spaced to compress the layer into a bat B of approximately the desired thickness.

At the spraying apparatus S', the other side of the fabric faced layer 20 is sprayed with a vulcanizable rubber latex so as to insure a uniform coating of the rubber latex over the fiber. It will be understood, however, that if the bat is relatively thin, or if only a light coating of rubber latex is desired, the spray apparatus S' may not be used. Also, while spraying has been found to be most suitable, other means of applying a bonding agent to the fibrous bat may be employed, such as an immersion tank or the like.

During the passage of the laminated web through the drier on the conveyor 29a, it again passes between a set of sizing rolls 34 while in a partially dried condition in order to insure the desired uniform thickness of the finished bat. In general, the ratio of reduction in thickness of the layer 20 in passing through the sets of sizing rolls 33 and 34 will be in the neighborhood of 4 to 1. This has been found necessary in practice if the finished bat B is to have the desired resilient resistance toward taking a permanent set. In the final pass through the drier, over the uppermost conveyor 29b, the laminated bat and fabric are subjected to sufficiently high temperatures to effect a vulcanization, or cure, of the rubber latex, say in the neighborhood of 225 to 250° F.

The finished bat B (Fig. 5) comprises a fibrous layer 40 having a fabric facing 41 bonded to one surface thereof. The fibrous layer 40 comprises loosely associated, intermingled fibers having a coating of a bonding composition, such as vulcanized rubber, over the surfaces thereof that serves to hold the fibers together at their points of contact. While the fibers appear to have a haphazard arrangement, it will be found that the "grain" of the fiber, or principal axes, lie in planes parallel to the forming surface, that is, the surface of the conveyor 19. Owing, however, to the effect of the transversely positioned lapper 12, there is no predominant directional orientation of the fibers in the horizontal planes (as viewed in Fig. 5) but the fibers lie almost equally as much in the direction of travel of the conveyor 19 as they do in a direction at right angles thereto. It is thus possible, by cutting or otherwise separating the bat 40 vertically in a plane parallel to the direction of travel of the conveyor 19 or at right angles thereto, and then laminating the strips with their freshly formed edges lying in the same plane, to build a cushion having a much higher degree of stiff resiliency, due to the fact that the load applied to the cushion is resisted by the endwise thrust of the fibers. A cushion so constructed is more fully described and claimed in my copending application entitled "Cushion," Serial No. 272,383, filed May 8, 1939.

While I have shown a method of making a fibrous bat surfaced with a fabric layer on one side, it will be understood that the fabric layer may be omitted entirely, or a similar layer may be placed on the other side. Likewise, instead of making a single thickness bat, a plurality of bats may be formed simultaneously and the bats laminated together in a continuous fashion.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of forming a continuous bat of rubberized tampico fibers, which comprises superimposing layers of loosely intermingled tampico fibers on a generally horizontal traveling surface with the fibers therein largely oriented in planes parallel to the plane of said surface but pointing in random directions in said planes, spraying the upper surface of said superimposed layers with a vulcanizable rubber latex at a point in their travel, sucking air downwardly through said superimposed layers at substantially the same point to remove any excess of sprayed latex and cause said sprayed latex to thoroughly impregnate and coat the fibers of said layers while initiating the drying thereof, compressing said superimposed layers to the desired thickness while in a sprayed and partially dried state, and vulcanizing said superimposed layers while so compressed to form a continuous springy bat of bonded-together rubberized tampico fibers.

2. The method of forming a continuous bat of rubberized tampico fibers which comprises superimposing layers of loosely intermingled tampico fibers on a generally horizontal traveling surface with the fibers therein largely oriented in planes parallel to the plane of said surface but pointing in random directions in said planes, spraying the upper surface of said superimposed layers with a vulcanizable rubber latex at a point in their travel, passing air downwardly through said superimposed layers to remove any excess of sprayed latex and cause said sprayed latex thoroughly to impregnate and coat the fibers of said layers while initiating the drying thereof, compressing said superimposed layers to the desired thickness and vulcanizing said superimposed layers while so compressed to form a continuous springy bat of bonded-together rubberized tampico fibers.

THOMAS A. UNSWORTH.